(12) United States Patent
Kurata et al.

(10) Patent No.: US 9,388,267 B2
(45) Date of Patent: Jul. 12, 2016

(54) PHOTOCURABLE ELASTOMER COMPOSITION, SEAL MATERIAL, GASKET FOR HARD DISC DRIVE, HARD DISC DRIVE AND APPARATUS

(71) Applicant: BRIDGESTONE CORPORATION, Chuo-ku, Tokyo (JP)

(72) Inventors: Toshihiko Kurata, Yokohama (JP); Takehiro Sano, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/762,891

(22) PCT Filed: Feb. 4, 2014

(86) PCT No.: PCT/JP2014/000582
§ 371 (c)(1),
(2) Date: Jul. 23, 2015

(87) PCT Pub. No.: WO2014/119340
PCT Pub. Date: Aug. 7, 2014

(65) Prior Publication Data
US 2015/0368388 A1 Dec. 24, 2015

(30) Foreign Application Priority Data

Feb. 4, 2013 (JP) ................................ 2013-019645
Feb. 4, 2013 (JP) ................................ 2013-019659
Feb. 4, 2013 (JP) ................................ 2013-019702

(51) Int. Cl.
| | |
|---|---|
| *C08F 2/50* | (2006.01) |
| *C08F 2/46* | (2006.01) |
| *C08G 61/04* | (2006.01) |
| *C08F 255/08* | (2006.01) |
| *C08F 2/48* | (2006.01) |
| *C08F 255/10* | (2006.01) |
| *C08L 15/00* | (2006.01) |
| *C08L 51/06* | (2006.01) |
| *C09K 3/10* | (2006.01) |
| *C08L 51/00* | (2006.01) |

(52) U.S. Cl.
CPC .............. *C08F 255/08* (2013.01); *C08F 2/48* (2013.01); *C08F 255/10* (2013.01); *C08L 15/00* (2013.01); *C08L 51/003* (2013.01); *C08L 51/06* (2013.01); *C09K 3/1006* (2013.01); *C08L 2203/20* (2013.01); *C08L 2205/02* (2013.01); *C09K 2003/1062* (2013.01); *C09K 2200/0625* (2013.01)

(58) Field of Classification Search
CPC ..... C08F 255/08; C08L 51/06; C08L 2203/20; C08L 51/03; C08L 2205/02
USPC .................... 522/33, 6, 1, 71, 189, 184; 520/1
See application file for complete search history.

(56) References Cited

FOREIGN PATENT DOCUMENTS

| | | |
|---|---|---|
| CN | 101415769 A | 4/2009 |
| EP | 1440988 A1 | 7/2004 |
| JP | 2003-147032 A | 5/2003 |
| JP | 2005-154528 A | 6/2005 |
| JP | 2006-036947 A | 2/2006 |
| JP | 2008-291127 A | 12/2008 |
| JP | 2009-043295 A | 2/2009 |
| JP | 2010-106121 A | 5/2010 |
| JP | 2010-260918 A | 11/2010 |
| JP | 2012-102243 A | 5/2012 |
| JP | 2012-116931 A | 6/2012 |
| JP | 2013-019645 A | 1/2013 |
| JP | 2013-019659 A | 1/2013 |
| JP | 2013-019702 A | 1/2013 |
| JP | 2013-245256 A | 12/2013 |
| WO | 2006-001522 * | 1/2006 |
| WO | 2006/001522 A1 | 1/2006 |
| WO | 2008/032851 A1 | 3/2008 |

OTHER PUBLICATIONS

Hirabayashi et al, WO 2006-001522 Machine Translation, Jan. 5, 2006.*
Apr. 8, 2014 International Search Report issued in International Patent Application No. PCT/JP2014/000582.
Apr. 1, 2014, Notification of Reasons for Refusal issued by the Japan Patent Office in the corresponding Japanese Patent Application No. 2013-019702.
Apr. 1, 2014, Notification of Reasons for Refusal issued by the Japan Patent Office in the corresponding Japanese Patent Application No. 2013-019659.
Apr. 1, 2014, Notification of Reasons for Refusal issued by the Japan Patent Office in the corresponding Japanese Patent Application No. 2013-019645.

* cited by examiner

*Primary Examiner* — Ling Choi
*Assistant Examiner* — Jessica E Whiteley
(74) *Attorney, Agent, or Firm* — Kenja IP Law PC

(57) ABSTRACT

A photocurable elastomer composition comprising: (A) a liquid polymer having a number average molecular weight of 5,000 or more, and mainly containing —[$CH_2C(CH_3)_2$]— units; (B) a (meth)acrylate monomer; and (C) a photo polymerization initiator, the mass ratio ((A):(B)) between the component (A) and the component (B) being 10:90 to 39:61.

21 Claims, No Drawings

PHOTOCURABLE ELASTOMER COMPOSITION, SEAL MATERIAL, GASKET FOR HARD DISC DRIVE, HARD DISC DRIVE AND APPARATUS

TECHNICAL FIELD

This disclosure relates to a photocurable elastomer composition, a seal material, a gasket for hard disc drive, a hard disc drive and an apparatus.

BACKGROUND

Presently, so-called hard coating materials are the mainstream of ultraviolet curable seal materials. Raw materials of such hard coating materials are ordinarily compositions having a main component of bisphenol A type epoxy (meth) acrylate. Such compositions are excellent in gas/water vapor barrier property (hereinafter, water vapor barrier property is referred to as merely "barrier property" if without special definition), while on the other hand, the cured products thereof are extremely hard. Therefore, such compositions are unusable in cases that softness or flexibility is required. Materials for use in seal materials required for softness include, for example, a material which has a probability of being bended, such as a sealer or packing relating to flexible display and the like, or members used in a high-compressed condition, such as a gasket for hard disc drive (hereinafter referred to as "HDD") and the like (for example, JP2010-260918A and JP2009-43295A (PTL 1 and PTL 2)).

On the other hand, ultraviolet curable materials having softness (hereinafter referred to as "ultraviolet curable elastomer" in order to clearly distinguish from ultraviolet curable materials without softness) include polyester acrylate, urethane acrylate, etc. (For example, see PTL 1 and PTL 2.)

CITATION LIST

Patent Literature

PTL 1: JP2010-260918A
PTL 2: JP2009-43295A

SUMMARY

Technical Problem

Recently in the technical field of seal material, desired is an ultraviolet curable material having softness, which has a barrier property higher than ultraviolet curable elastomers such as polyester acrylate, urethane acrylate and the like. After intensive study, we have discovered that it is possible to further improve the softness and barrier property of a photocurable composition by using a liquid polymer such as polyisobutylene and the like therein.

However, it was found that in the case of curing a photocurable composition containing the liquid polymer, the liquid polymer may bleed out (moves out) to the seal material (cured product) surface. Since the liquid polymer improves softness and barrier property, if the liquid polymer is decreased due to bleeding out from the seal material (cured product), a problem would be caused that the seal material (cured product) cracks easily, and that the barrier property is deteriorated. Further, when sealing components as a seal material, a problem would be caused that the liquid polymer bled out stains the components.

This disclosure is to solve the aforementioned problems, and is to provide a photocurable elastomer composition excellent in softness and barrier property, and capable of suppressing bleeding out, when curing the photocurable elastomer composition.

Solution to Problem

The photocurable elastomer composition relating to this disclosure contains: (A) a liquid polymer having a number average molecular weight of 5,000 or more, and mainly containing $[CH_2C(CH_3)_2]$— units; (B) a (meth)acrylate monomer; and (C) a photo polymerization initiator, the mass ratio ((A):(B)) between the component (A) and the component (B) being 10:90 to 39:61.

In the present Specification, the "photo" in "photocurable" and "photo polymerization" is inclusive of ultraviolet rays, visible radiations, charged particle radiations such as α-ray, β-ray, electron beam and the like, electromagnetic waves such as γ-ray, and ionizing radiations containing high-energy particles, among which ultraviolet rays are preferable.

In the present Specification, the "number average molecular weight", if without special definition, refers to a number average molecular weight represented with a value in terms of standard polystyrene, measured via gel permeation chromatography (GPC).

In the present Specification, the percentage of the —$[CH_2C(CH_3)_2]$— units in the liquid polymer of the component (A), the percentage of the units derived from polyisoprene, units derived from polybutadiene, units derived from styrene-butadiene copolymer, and units derived from ethylene-propylene copolymer and units derived from hydrogenated products thereof in the polymer of the component (D) can be determined by using an NMR peak ratio.

In the present Specification, "liquid" refers to having fluidity at a shaping temperature, for example, at room temperature (25° C.).

In the present Specification, the (meth)acrylate refers to at least one of acrylate and methacrylate.

In the present Specification, the vinyl group refers to ($CH_2$=$CH$—), the "(meth)acryloyl" refers to at least one of acryloyl and methacryloyl, the acryloyl group refers to ($CH_2$=$CHCO$—), and the methacryloyl group refers to ($CH_2$=$C(CH_3)CO$—).

In the present Specification, the "isobutylene skeleton" refers to a skeleton formed of —$[CH_2$—$C(CH_3)_2]$— units, the "butadiene skeleton" refers to a skeleton formed of at least one selected from the group consisting of: (i) —$[CH_2$—$CH$=$CH$—$CH_2]$— unit (cis-1,4 bond); (ii) —$[CH_2$—$CH$=$CH$—$CH_2]$— unit (trans-1,4 bond), and (iii) —$[CH_2$—$CH(CH$=$CH_2)]$— unit (1,2 bond), the "isoprene skeleton" refers to a skeleton formed of at least one selected from the group consisting of: (i) —$[CH_2$—$C(CH_3)$=$CH$—$CH_2]$— unit (cis-1,4 bond); (ii) —$[CH_2$—$C(CH_3)$=$CH$—$CH_2]$— unit (trans-1,4 bond); (iii) —$[CH_2$—$C(CH_3)(CH$=$CH_2)]$— unit (1,2 bond); and (iv) —$[CH_2$—$C(C(CH_3)$=$CH_2)]$-unit (3,4 bond).

In the present Specification, the "cyclic hydrocarbon" refers to not only aliphatic cyclic hydrocarbons, but also aromatic cyclic hydrocarbons.

In the present Specification, the seal material refers to a conception inclusive of sealers, sealing materials, gaskets and packings. In addition, in the present Specification, the seal material, gasket and packing refers to both fixed seals (stationary seals) and dynamic seals, if without special definition.

Advantageous Effect

According to this disclosure, it is possible to provide a photocurable elastomer composition excellent in softness and barrier property, and capable of suppressing bleeding out.

DETAILED DESCRIPTION

Photo Curable Elastomer Composition

Examples of preferable embodiments of the photocurable elastomer composition relating to this disclosure are described in the following.

(First Embodiment of the Photocurable Elastomer Composition)

The photocurable elastomer composition relating to the first embodiment of this disclosure contains: (A) a liquid polymer having a number average molecular weight of 5,000 or more, and mainly containing $[CH_2C(CH_3)_2]$— units; (B) a (meth)acrylate monomer; and (C) a photo polymerization initiator, the mass ratio ((A):(B)) between the component (A) and the component (B) being 10:90 to 39:61.

The specific liquid polymer mentioned above as the component (A) can bring excellent softness and barrier property to the cured product of the photocurable elastomer composition relating to this disclosure.

In addition, by setting the number average molecular weight of the component (A) to be 5,000 or more, and setting the mass ratio ((A):(B)) between the component (A) and the component (B) to be 10:90 to 39:61, it is possible to guarantee an excellent softness, and simultaneously suppress bleeding out of the component (A), when curing the photocurable elastomer composition.

The components (A) to (C) and other components which are optionally included in the photocurable elastomer composition relating to this disclosure are described in the following.

[Component (A)]

The component (A) is a liquid polymer having a number average molecular weight of 5,000 or more, and mainly containing —$[CH_2C(CH_3)_2]$— units (units derived from polyisobutylene).

By setting the number average molecular weight of the component (A) to be 5,000 or more, bleeding out of the component (A) can be suppressed easily. The number average molecular weight of the component (A) is preferably 20,000 to 60,000, and more preferably 30,000 to 40,000. By setting the number average molecular weight of the component (A) to be 20,000 or more, bleeding out of the component (A) can be further suppressed easily.

The component (A) is a liquid polymer mainly containing —$[CH_2C(CH_3)_2]$— units. Besides the —$[CH_2C(CH_3)_2]$— units, the molecules of the component (A) may also contain a denaturant, etc. used in synthesis of the component (A). In other words, as long as mainly containing —$[CH_2C(CH_3)_2]$— units, the component (A) may also be a polymer having modified terminals and a polymer containing other units or repeating units other than —$[CH_2C(CH_3)_2]$— units (for example, a block copolymer). The component (A) preferably contains 80 mass % or more of —$[CH_2C(CH_3)_2]$— units. The component (A) can exhibit excellent softness and barrier property by mainly containing —$[CH_2C(CH_3)_2]$— units.

The component (A) mainly contains —$[CH_2C(CH_3)_2]$— units, and thus is ordinarily an unreactive (non-crosslinkable) liquid polymer. As mentioned above, the component (A) has an effect of exhibiting excellent softness, and thus preferably does not contain reactive functional groups such as (meth)acryloyl group and the like, but may contain reactive functional groups such as (meth)acryloyl group and the like as long as within the scope of the subject of this disclosure.

The aforementioned component (A) is a liquid. If being a solid, the component (A) is difficult to be blended with other components.

As for the component (A), a commercially available polyisobutylene having a number average molecular weight of 5,000 or more may be used. As for such a commercially available product of the composition (A), for example, trade names Epion® 200A (number average molecular weight 5,000), 400A (number average molecular weight 10,000), 600A (number average molecular weight 15,000), made by Kaneka Corporation, trade names Tetrax® 3T (number average molecular weight 30,000), 4T (number average molecular weight 40,000), 5T (number average molecular weight 50,000) and 6T (number average molecular weight 60,000) made by JX Nippon Oil & Energy Corp., etc. may be used.

The component (A) may be used singly or in a combination of two or more.

The photocurable elastomer composition relating to this disclosure has a mass ratio ((A):(B)) between the component (A) and a component (B) mentioned below of 10:90 to 39:61. By setting the number average molecular weight of the component (A) to be 5,000 or more, and setting the mass ratio ((A):(B)) between the component (A) and the component (B) mentioned below to be 10:90 to 39:61, it is possible to guarantee an excellent softness, and simultaneously suppress bleeding out of the component (A), when curing the photocurable elastomer composition.

In the mass ratio ((A):(B)), if the component (A) is as much as 10:90 or more, it is advantageous in the point of barrier property. In addition, in the mass ratio ((A):(B)), if the component (B) is as much as 30:70 or more, bleeding out of the component (A) can be suppressed easily.

[Component (B)]

The (meth)acrylate monomer of the component (B) has a function of bringing photocurability (formability) to the photocurable elastomer composition relating to this disclosure, and a function of adjusting the viscosity. As for the component (B), a (meth)acrylate monomer used in a conventional well-known photocurable composition may be used. The component (B) may be used singly or in a combination of two or more. The (meth)acrylate monomer of the component (B) may be any monomer having one or more (meth)acryloyl groups, and preferably has only one (meth)acryloyl group. The molecular weight of the (meth)acrylate monomer of the component (B) may be selected appropriately depending on the usage, use state, required performances, etc. of the photocurable elastomer composition relating to this disclosure, and is preferably less than 1000. Thereby, the reduction effect of the viscosity of the photocurable elastomer composition relating to this disclosure is improved.

As for the photocurable elastomer composition relating to this disclosure, the component (B) is preferably a monofunctional acrylate. By using a monofunctional acrylate as the component (B), it is possible to reduce the viscosity of the photocurable elastomer composition, and to improve the appliability and the productivity thereof.

As for the monofunctional (meth)acrylate monomer having a molecular weight of less than 1000, n-butyl (meth)acrylate, 2-ethylhexyl (meth)acrylate, cyclohexyl (meth)acrylate, dicyclopentanyl (meth)acrylate, dicyclopentenyl (meth)acrylate, dicyclopentenyloxyethyl (meth)acrylate, diethyleneglycolmonoethylether (meth)acrylate, dimethylaminoethyl (meth)acrylate, dipropyleneglycolmono (meth)

acrylate, ethoxydiethyleneglycol (meth)acrylate, ethoxylated phenyl (meth)acrylate, ethyl (meth)acrylate, isoamyl (meth) acrylate, isobornyl (meth)acrylate, isobutyl (meth)acrylate, isodecyl (meth)acrylate, isooctyl (meth)acrylate, isomyristyl (meth)acrylate, isostearyl (meth)acrylate, n-octadecyl (meth) acrylate, lauroxypolyethyleneglycol (meth)acrylate, lauryl (meth)acrylate, methoxydipropyleneglycol (meth)acrylate, methoxy tripropylene glycol (meth)acrylate, methoxypolyethyleneglycol (meth)acrylate, methoxytriethyleneglycol (meth)acrylate, etc. may be used.

Additionally, for example, the (meth)acryloyl based monomers disclosed in PTL 1 and PTL 2 may be used.

As for the photocurable elastomer composition relating to this disclosure, the component (B) is at least one selected from the group consisting of hydrocarbon (meth)acrylates having 6 or more carbon atoms, isobornyl (meth)acrylate, and (meth)acrylates derived from dicyclopentadiene. Thereby, it is possible to obtain higher softness and barrier property. In addition, the compatibility and toughness thereof are excellent as well.

The number of carbon atoms of the hydrocarbon (meth) acrylate having 6 or more carbon atoms is preferably 6 to 24. The hydrocarbon part of the hydrocarbon (meth)acrylate having 6 or more carbon atoms may be either linear, branched or cyclic. As for the hydrocarbon (meth)acrylate having 6 or more carbon atoms, for example, n-butyl(meth)acrylate, 2-ethylhexyl (meth)acrylate, lauryl(meth)acrylate, isomyristyl(meth)acrylate, isostearyl(meth)acrylate, n-octadecyl (meth)acrylate, esters of (meth)acryl acid and polyhydric alcohols, etc. may be used. As for the (meth)acrylates derived from dicyclopentadiene, for example, dicyclopentanyl (meth)acrylate, dicyclopentenyl (meth)acrylate, dicyclopentenyloxyethyl (meth)acrylate, norbornyl (meth)acrylate, etc. may be used.

The content of the component (B) in the photocurable elastomer composition may be adjusted appropriately depending on the usage, use state, required performances, etc. within the range of mass ratio with the component (A). When the photocurable elastomer composition further contains a component (D) mentioned below, the content of the component (B) is preferably 25 to 55 mass % with respect to the total amount of the component (A), the component (B) and the component (D). By being within such a range, the photocurable elastomer composition can exhibit an excellent formability, softness and barrier property.

[Component (C)]

The photo polymerization initiator of the component (C) has a function of initiating or accelerating photo polymerization or curing of the photocurable component. The photo polymerization initiator may be, for example, one used in a conventional photocurable composition, such as those disclosed in PTL 1 and PTL 2.

As for the component (C), for example, benzoin alkyl ether based photo polymerization initiators such as benzoin ethyl ether, benzoin isobutyl ether, benzoin isopropyl ether and the like; acetophenone based photo polymerization initiators such as 2,2-diethoxyacetophenone, 4'-phenoxy-2,2-dichloroacetophenone and the like; propiophenone based photo polymerization initiators such as 2-hydroxy-2-methylpropiophenone, 4'-isopropyl-2-hydroxy-2-methylpropiophenone, 4'-dodecyl-2-hydroxy-2-methylpropiophenone and the like; benzyldimethylketal, 1-hydroxycyclohexylphenylketone, and anthraquinone based photo polymerization initiators such as 2-ethylanthraquinone, 2-chloroanthraquinone and the like; and intramolecular cleavage type photo polymerization initiators such as acylphosphine oxide based photo polymerization initiator and the like may be use. Here, anthraquinone based photo polymerization initiators such as 1-hydroxycyclohexylphenylketone and the like, and propiophenone based photo polymerization initiators such as 2-hydroxy-2-methylpropiophenone and the like are preferably used.

Further, as for the component (C), hydrogen abstraction type photo polymerization initiators such as benzophenone/ amine based photo polymerization initiators, Michler's ketone/benzophenone based photo polymerization initiators, thioxanthone/amine based photo polymerization initiators and the like may be used. Among the photo polymerization initiators, a 1-hydroxycyclohexylphenylketone (trade name Irgacure® 184, made by BASF) is particularly preferable.

The photo polymerization initiator of the component (C) may be used singly or in a combination of two or more. The content of the photo polymerization initiator may be adjusted depending on the type, the content, etc. of the photocurable component in the photocurable elastomer composition. The content of the photo polymerization initiator is ordinarily, for example, with respect to 100 parts by mass in total of the photocurable component (for example, the aforementioned component (A), the aforementioned component (B) and a component (D) mentioned below), 0.1 to 10 parts by mass, more preferably 0.5 to 5 parts by mass, and further more preferably 0.5 to 3 parts by mass. In addition, a well-known photosensitizer may be used along with the aforementioned photo polymerization initiator.

[Optional Components]

The photocurable elastomer composition relating to this disclosure may contain, as long as within the subject of this disclosure, if necessary, a component (D) mentioned below; a component (E) (an inorganic filler and an organic filler); an organic thixotropic agent (a thixotropic agent); a coupling agent; an antioxidant (an anti-aging agent); a photostabilizer; a carbodiimide (a humid heat resistant age resister); a fatty acid such as a stearic acid and the like (a lubricant); a fatty acid metallic salt such as calcium stearate and the like (a lubricant); a fatty acid amide such as stearic acid amide and the like (a thickener); a fatty acid ester (a plasticizer); an internal release agent such as polyolefin wax, paraffin wax and the like; a softener such as a process oil and the like; a colorant; a leveling agent; a solvent, etc.

The coupling agent, the antioxidant (anti-aging agent) and the photostabilizer may be those disclosed in PTL 1 and PTL 2.

The component (D), the component (E) and the organic thixotropic agent would be described below.

[Component (D)]

The photocurable elastomer composition relating to this disclosure preferably further contains as the component (D) a polymer having a number average molecular weight of 1,000 or more and having two or more reactive functional groups per molecule, which are selected at least one from the group consisting of (meth)acryloyl group, vinyl group, vinylidene group and maleimide group, at 100 parts by mass of less, and preferably at 20 to 85 parts by mass with respect to 100 parts by mass in total of the component (A) and the component (B). By containing such a component (D) at a specific amount with respect to the total amount of the component (A) and the component (B), it is possible to obtain a cured product of the photocurable elastomer composition excellent in softness and barrier property, suppressed in bleeding out and having a low compression set.

A photocurable elastomer composition having such a low compression set may be applied widely in seal materials, and is preferably used in a gasket for HDD in particular.

This is for the reason that in a gasket for HDD, after performing sealing between adherends (also called adherent materials), it is possible to release (separate) the sealing between the adherends, and seal the adherents again by using the same gasket, i.e. for the requirement of reworkability.

In a gasket for HDD, a sealability is required such that (i) invasion of dust or water vapor from the outside is prevented, and that (ii) leakage of the inert gas sealed in the inside of the apparatus is prevented. The gasket for HDD is an elastic body, and exhibits such a sealability by being sandwiched between two covers. However, in this case, if without sufficient softness, the gasket for HDD cannot fit with the aforementioned covers, resulting in that invasion of dust and/or water vapor cannot be prevented, and the inert gas sealed therein leaks out. In addition, if the barrier property of a material of a gasket for HDD is low, water vapor and/or inert gas would pass through the material. Further, if the compression set of the aforementioned material is high (poor), when releasing the adherence and re-adhering by using the same gasket, the gasket does not recover to a predetermined size (height), and thus a gap is generated when the covers are closed according to the predetermined size, and the sealing becomes insufficient and cannot obtain sufficient reworkability. By contrast, it is possible to reduce the compression set and to obtain sufficient sealability, by containing the component (D) at a specific amount with respect to the total amount of the component (A) and the component (B).

The component (D) may be used singly or in a combination of two or more.

The component (D) contains two or more reactive functional groups per molecule selected at least one from a group consisting of (meth)acryloyl group, vinyl group, vinylidene group and maleimide group. By using reactive functional groups mentioned above, the photoactivity of ultraviolet ray, etc. is excellent. In addition, by having two or more such reactive functional groups per molecule, there is an advantage that a three-dimensional crosslinking is formed, which reduces the compression set. The number of reactive functional groups per molecule in the component (D) is two or more, and is preferably 2 to 6.

The number average molecular weight of the component (D) is 1,000 or more, preferably 2,000 to 20,000, and furthermore preferably 3,000 to 20,000. By setting the number average molecular weight of the component (D) to be 1,000 or more, it is possible to guarantee the barrier property of the cured product of the photocurable elastomer composition, and simultaneously improve the softness and the sealability thereof. By setting the number average molecular weight to be 3,000 or more, the softness thereof is further improved. Additionally, by setting the number average molecular weight to be 20,000 or less, it is possible to maintain the viscosity of the photocurable elastomer composition at a low value, and to improve the productivity.

In the photocurable elastomer composition relating to this disclosure, the component (D) has a number average molecular weight of 2,000 or more, and is preferably a polymer mainly containing any one selected from the group consisting of polyisoprene, polybutadiene, styrene-butadiene copolymer, ethylene-propylene copolymer (EP), and hydrogenated products thereof. It is possible to obtain a more excellent softness and barrier property by using such a polymer as the component (D).

In this case, the component (D) only has to be a polymer mainly contain the aforementioned unit, and may be either a polymer containing the components such as denaturant and the like used in synthesis of the component (D), or a polymer having modified terminals and a polymer containing units or repeating units other than the aforementioned units (for example, a block copolymer). The component (D) preferably contains the aforementioned units at 80 mass % or more.

Such a component (D) may be, for example, trade name UC-102 (a methacryl-modified polyisoprene, number average molecular weight: 17,000, having two reactive functional groups on the side chains), made by Kuraray Co., Ltd., trade name CN-307 (a polybutadiene diacrylate, number average molecular weight: 3500, having two reactive functional groups), made by Arkema, CN-9014, trade name TEAI-1000 (a hydrogenated polybutadiene diacrylate having acryl groups on both terminals thereof, number average molecular weight: 2000), made by Nippon Soda Co., Ltd., etc.

Further, a urethane based acrylate polymer (for example, UV-2000B made by the Nippon Synthetic Chemical Industry Co., Ltd., weight average molecular weight: 13,000, having two (meth)acryloyl groups on both terminals), a hydrogenated polybutadiene diacrylate (for example, trade name CN9014 made by Sartomer (number average molecular weight: 6,500, having (meth)acryloyl groups on both terminals, the main skeleton being hydrogenated), a methacryl-modified isoprene rubber (for example, trade name UC-203 made by Kuraray Co., Ltd., number average molecular weight: 27,000, having three (meth)acryloyl groups on the side chains, the main skeleton being non-hydrogenated), etc. may be used as well.

Further, among the above, the component (D) is preferably a polymer mainly containing any one selected from the group consisting of units derived from polyisoprene, units derived from polybutadiene, units derived from styrene-butadiene copolymer, and units derived from ethylene-propylene copolymer (EP), which is not a hydrogenated product (having carbon-carbon unsaturated bonds). Such a polymer which is not a hydrogenated product has advantages of low cost, easiness of obtaining, low viscosity, and possibility of shortening of the synthesis process.

As such a component (D) having carbon-carbon unsaturated bonds, for example, trade name UC-102 made by Kuraray Co., Ltd., trade name CN-307 made by Arkema.

The content of the component (D), with respect to 100 parts by mass in total of the component (A) and the component (B), is preferably contained at 100 parts by mass or less, and may be adjusted appropriately depending on the usage, use state, required performances, etc., as long as within the scope of the subject of this disclosure.

In the component (D), the mass ratio ((A):(D)) between the component (A) and the component (D) is preferably 7:93 to 75:25. In such a range, the photocurable elastomer composition can exhibit excellent softness, barrier property and compression set.

[Component (E)]

As for the inorganic filler of the component (E), silica ($SiO_2$), alumina, titania, complex oxides and layered oxides thereof, clay minerals, etc. may be used. Among the above, silica is preferable.

More specifically, a silica micro powder micronized via a dry method (for example, trade name: Aerosil 300, made by Nippon Aerosil Co., Ltd.), etc. may be used.

The average particle size of the inorganic filler, from the viewpoint of providing thickenability and pseudoplasticity, is preferably 5 to 50 μm, and more preferably 5 to 12 μm. Further, the average particle size of the inorganic filler may be determined, for example, with a method such as BET absorption, SEM and the like.

When the photocurable elastomer composition contains the component (E), the content thereof may be adjusted appropriately, and is preferably, with respect to 100 parts by mass in total of the photocurable elastomer composition, 0.1 to 30 parts by mass, and more preferably 1 to 15 parts by mass.

As for the organic filler of the component (E) (the organic thixotropic agent), a conventional one, for example, a hydrogenated castor oil, an amide wax, a mixture thereof, etc. may be used. As a specific example, those disclosed in JP2012-72204A may be used.

[Viscosity of the Photocurable Elastomer Composition]

The photocurable elastomer composition relating to this disclosure preferably has a viscosity of 1 to 10,000 Pa·s, at a temperature of 50° C. and a shear rate of 1.0/second. By setting the viscosity in such as range, the photocurable elastomer composition has a moderate fluidity and an excellent handleability, and it is possible to maintain the shape of the photocurable elastomer composition according to a desired shape of a seal material such as a gasket and the like, and to thereby maintain the shape of the seal material.

The viscosity of the photocurable elastomer composition is preferably 10 to 2,000 Pa·s, and more preferably 30 to 1,000 Pa·s.

<<Method for Measuring the Viscosity>>

The measurement is performed by using a rheometer "RS-600" (made by HAAKE). Adjust the photocurable elastomer composition to 50° C., measure the shear stress while varying the shear rate within the range of 1 to 10 s$^{-1}$ at a gap of 0.2 mm, draw an approximate line by using the least squares method in a Casson plot obtained by plotting the shear rate and the stress to the ½ power, and calculate the viscosity in terms of 1 s$^{-1}$.

[Method for Preparing the Photocurable Elastomer Composition]

The method for preparing the photocurable elastomer composition of this disclosure is not specifically limited, and may be one well known in the art.

For example, it is possible to prepare the composition by kneading the component (A), the component (B), the component (C) and the optional components using a temperature adjustable kneading machine (for example, a single screw extruder, a twin screw extruder, a planetary mixer, a twin screw mixer, a high-shear mixer, etc.).

The photocurable elastomer composition relating to this disclosure is preferably used as a seal material, since the photocurable elastomer composition relating to this disclosure is excellent in softness and barrier property, and capable of suppressing bleeding out as mentioned above.

(Second Embodiment of the Photocurable Elastomer Composition)

The photocurable elastomer composition relating to the second embodiment of this disclosure contains: (A) a liquid polymer having a number average molecular weight of 5,000 or more, and mainly containing —[CH$_2$C(CH$_3$)$_2$]— units; (B) a (meth)acrylate monomer; and (C) a photo polymerization initiator, the mass ratio ((A):(B)) between the component (A) and the component (B) being 10:90 to 39:61, where:

the molecular weight of the component (A) is 5,000 to 15,000, and further contains:

as the component (D), a polymer having a number average molecular weight of 1,000 or more and having two or more reactive functional groups per molecule, which are at least one selected from the group consisting of (meth)acryloyl group, vinyl group, vinylidene group and maleimide group, where:

the mass ratio ((D):(A)) between the component (D) and the component (A) is 20:80 to 80:20, and the content of the component (B) is 40 mass % to 70 mass % with respect to the total amount of the component (D), the component (A) and the component (B).

According to this configuration, the softness, barrier property and compression set when cured and the workability are excellent.

In the second embodiment, the number average molecular weight of the component (A) is 5,000 to 15,000, and more preferably 5,000 to 10,000. By setting the number average molecular weight of the component (A) to be 15,000 or lower, it is possible to reduce the viscosity and simplify the compounding.

In the second embodiment, the content of the component (A), as long as the mass ratio ((D):(A)) between the content of the component (D) and the content of the component (A) is within a predetermined range, is not specifically limited, and may be adjusted appropriately depending on the usage, use state, required performances, etc., and is preferably 10 mass % to 40 mass % with respect to the total amount of the component (D), the component (A) and the component (B). By setting the content of the component (A) to be 10 mass % or more, the barrier property when cured is excellent, and by setting the same to be 40 mass % or less, the composition is excellent by having a low viscosity and being easy to compound, and is possible to suppress bleeding out of the component (A) from a cured product.

In the second embodiment, the mass ratio ((D):(A)) between the content of the component (D) and the content of the component (A) is not specifically limited as long as within the range of 20:80 to 80:20, and may be adjusted appropriately depending on the usage, use state, required performances, etc., and is preferably 30:70 to 70:30, more preferably 40:60 to 60:40. By setting the mass ratio ((D):(A)) to be 20 or more: 80 or less, it is possible to improve the compression set when cured, and by setting the same to be 80 or less: 20 or more, it is possible to express a high barrier property when cured. On the other hand, by setting the mass ratio ((D):(A)) to be the preferable range, or within the more preferable range, it is advantageous in the point that both the high barrier property and the excellent compression set when cured can be achieved.

In the second embodiment, the content of the component (B) is not specifically limited as long as within the range of 40 mass % to 70 mass % with respect to the total amount of the component (D), the component (A) and the component (B), and may be adjusted appropriately depending on the usage, use state, required performances, etc., and is preferably 40 mass % to 60 mass %. By setting the content of the component (B) to be 40 mass % or more, it is possible to obtain a low viscosity, and by setting the same to be 70 mass % or less, it is possible to guarantee the softness when cured. On the other hand, by setting the content of the component (B) within the preferable range, it is advantageous in the point of controllability within an appropriate viscosity range during the processing of the seal material.

In the second embodiment, the (meth)acrylate having a cyclic hydrocarbon skeleton (in particular, an isobornyl (meth)acrylate) is preferable as the component (B) in the point of the barrier when cured.

In the second embodiment, the main skeleton of the component (D) is not specifically limited and may be appropriately selected depending on the purpose from, for example, conjugated diene skeletons such as urethane skeleton, butadiene skeleton, isoprene skeleton and the like, isobutylene skeleton, etc. Among the above, butadiene skeleton is preferable in the point of the barrier property and the sealability when cured. In addition, the main skeleton is preferably hydrogenated, whereby it is possible to further improve the barrier property when cured, and to improve the heat resistance when cured. Further, the main skeleton is preferably a hydrogenated butadiene skeleton. Such a skeleton enables to further improve the barrier property when cured, and further improve the heat resistance, and is easily available.

In the second embodiment, the position of the (meth)acryloyl group in the molecules of the component (D) is not specifically limited and may be appropriately selected depending on the purpose. The position may be both terminals of the polymer and may be side chains of the polymer, where both terminals of the polymer is preferable in the point of preventing the viscosity and the compression set when cured from increasing, since it does not generate free branches (the part not involved in the crosslinking).

[Viscosity of the Photocurable Elastomer Composition of the Second Embodiment]

In the second embodiment, the viscosity of the photocurable elastomer composition is not specifically limited and may be selected appropriately depending on the purpose, and is preferably 8 Pa·s or less. If over 8 Pa·s, the composition is unsuitable for thin film coating. Further, a photocurable elastomer composition for display sealing material is mostly applied as thin film coating (about 100 μm), and thus preferably has a low viscosity.

(Third Embodiment of the Photocurable Elastomer Composition)

The photocurable elastomer composition relating to the third embodiment of this disclosure contains: (A) a liquid polymer having a number average molecular weight of 5,000 or more, and mainly containing —[$CH_2C(CH_3)_2$]— units; (B) a (meth)acrylate monomer; and (C) a photo polymerization initiator, the mass ratio ((A):(B)) between the component (A) and the component (B) being 10:90 to 39:61, and further, as the component (D), a polymer having a number average molecular weight of 3,000 or more and having two or more reactive functional groups per molecule, which are at least one selected from the group consisting of (meth)acryloyl group, vinyl group, vinylidene group and maleimide group, where:

the mass ratio ((A):(D)) between the component (A) and the component (D) is 7:93 to 75:25, and the content of the component (B) is 25 to 55 mass % with respect to the total amount of the component (A), the component (D) and the component (B).

By setting the mass ratio ((A):(D)) between the component (A) and the component (D) to be 7:93 to 75:25, when the photocurable elastomer composition is cured, excellent softness and barrier property are guaranteed and a low compression set is obtained.

Further, by setting the content of the component (B) to be 25 to 55 mass % with respect to the total amount of the component (A), the component (D) and the component (B), the photocurable elastomer composition can exhibit excellent formability, softness and barrier property.

In the third embodiment, the mass ratio ((A):(D)) between the component (A) and the component (D) is 7:93 to 75:25. Thereby, when the photocurable elastomer composition is cured, excellent softness and barrier property are guaranteed and a low compression set is obtained.

By having a hydrophobicity due to a hydrocarbon based skeleton and by having a bulky skeleton of —[$CH_2C(CH_3)_2$]— units, the component (A) achieves both the amorphousity and increasing the excluded volume, and the cured composition exhibits an excellent barrier property due to reduction of the diffusion rate of the water vapor (note that there is a probability that if existing alone, the component (A) is likely to flow along with the stress and remain as a permanent set). On the other hand, via crosslinking, when stress is released, the shape of the cured composition recovers to a certain degree due to the entropy elasticity of the component (D) itself, and thereby exhibits a low compression set. Additionally, by setting the mass ratio between the component (A) and the component (D) within the aforementioned specific range, the crosslinking density and the non-uniformity of crosslinking become appropriate (even brought into the gaps in the crosslinking structure of the component (D), the component (A) does not bring negative effects to the recovery via entropy elasticity of the component (D)), and thereby, excellent softness and barrier property are guaranteed and a low compression set is obtained.

The aforementioned mass ratio ((A):(D)), from the viewpoint of a low compression set, is preferably 8:92 to 50:50, and more preferably 8:92 to 30:70.

In the third embodiment, the number average molecular weight of the component (A) is not specifically limited if within a scope to exhibit the aforementioned softness and barrier property, while from the viewpoint of suppressing bleeding out (moving out) of the component (A) in the cured product of the photocurable elastomer composition to a surface of the cured product, the number average molecular weight of the component (A) is preferably 20,000 or more, and from the viewpoint of an appropriate viscosity of the photocurable elastomer composition and improvement of the productivity, the number average molecular weight is preferably 50,000 or less, and thus is more preferably 20,000 to 50,000.

In the third embodiment, the component (B) is preferably at least one monofunctional (meth)acrylate selected from the group consisting of hydrocarbon (meth)acrylates having 6 or more carbon atoms, isobornyl (meth)acrylate and (meth)acrylates derived from dicyclopentadiene. Thereby, it is possible to obtain higher softness and barrier property. In addition, the compatibility and toughness thereof are excellent as well.

In the third embodiment, the content of the component (B) only has to be 25 to 55 mass % with respect to the total amount of the component (A), the component (D) and the component (B), and may be adjusted appropriately depending on the usage, use state, required performances, etc. within this range. The content of the component (B) is preferably 30 to 40 mass % with respect to the total amount of the component (A), the component (D) and the component (B).

In the third embodiment, the component (D) is preferably a polymer mainly containing any one selected from the group consisting of units derived from polyisoprene, units derived from polybutadiene, units derived from styrene-butadiene copolymer, units derived from ethylene-propylene copolymer, and units derived from hydrogenated products thereof.

By using such a component (D), a cured product of the photocurable elastomer composition obtains a more lower compression set, and the barrier property thereof becomes more excellent as well.

In this case, the component (D) only has to be a polymer mainly containing the aforementioned unit, and may be either a polymer containing component such as denaturants used in synthesis of the component (D) and the like, or a polymer having modified terminals and a polymer containing units or repeating units other than the aforementioned units (for example, a block copolymer). The component (D) preferably contains 80 mass % or more of the aforementioned units.

In the third embodiment, the photocurable elastomer composition preferably further contains as the component (E) at least one selected from the group consisting of inorganic fillers and organic fillers. By using such a component (E), the photocurable elastomer composition is given pseudoplasticity, and formability of the photocurable elastomer composition is improved.

In the third embodiment, the component (E) is preferably a fumed silica. By using a fumed silica as the component (E), there is an advantage of an excellent pseudoplasticity. As for the fumed silica, for example, trade name HDK® N20, made by Wacker Asahikasei Silicone Co., Ltd., is preferably used.

The photocurable elastomer composition relating to the third embodiment is preferably used in a gasket for hard disc drive. The reason is that, as mentioned above, the photocurable elastomer composition relating to the third embodiment can exhibit excellent softness and barrier property, and a low compression set.

(Seal Material)

The seal material relating to this disclosure uses the aforementioned photocurable elastomer composition in at least a part thereof. In other words, the seal material relating to this disclosure is a seal material containing in at least a part thereof a cured product which is obtained by irradiating a light such as ultraviolet ray and the like to the aforementioned photocurable elastomer composition. The seal material relating to this disclosure is excellent in softness and barrier property and suppresses bleeding out, by using the aforementioned photocurable elastomer composition in at least a part thereof.

A seal material using the photocurable elastomer composition relating to the second embodiment in at least a part thereof is excellent in softness (low hardness), water vapor barrier property (low moisture permeability), workability and compression set. Softness of such a seal material may be adjusted appropriately depending on the usage, and is preferably 60 or less in terms of the Shore D hardness as follows, more preferably 50 or less, further more preferably 45 or less. Further, the seal material of this disclosure preferably has a high softness (a low hardness) when used in a flexible display, but if the Shore D hardness is over 60, the seal material is probably broken when being bended. In addition, such a seal material has to snap back to a certain degree when being bended. Therefore, the value of compression set after 22 hours at a test temperature of 70° C., and 30 minutes after releasing the compression, using a lamination of 5 pieces of the sheet having a thickness of 2 mm cut into a 2 cm rectangular shape as measurement samples, according to JIS K 6262, is preferably 80(%) or less, more preferably 40(%) or less. Thereby, a higher sealability is obtained.

The seal material relating to this disclosure may be used in, for example, gasket for HDD; seal material for ink tank; seal material for various computers such as desktop type, note type, tablet type and the like, mobile phone, various display devices such as liquid crystal display device, organic EL display, electronic paper, plasma display and the like, and for various electronic components such as camera and the like; seal material for automobile component, water purification equipment, air purification equipment, mixer, speaker, pump, etc.; seal material for vibration controlling device, waterproof equipment, damper, public works, construction, etc.; packings such as O-ring and the like, etc.

Among the above, the seal material relating to this disclosure is excellent in softness and barrier property, suppresses bleeding out, and thus is preferably used in a gasket for HDD. Further, as mentioned above, a seal material using in at least a part thereof a photocurable elastomer composition containing 100 parts by mass or less of the aforementioned component (D) with respect to 100 parts by mass in total of the component (A) and the component (B) is excellent in softness and barrier property, suppresses bleeding out, and further, has a low compression set, and thus is preferably used in a gasket for HDD.

The thickness of the seal material may be adjusted appropriately depending on the usage, and is ordinarily about 0.1 to about 2 mm.

[Method for Manufacturing a Component Equipped with the Seal Material]

By applying the aforementioned photocurable elastomer composition on an adherend, and irradiating a light to cure the same, a component equipped with the seal material is manufactured. The adherend may be selected appropriately, for example, depending on the usage. In the case of the gasket mentioned below, the adherend may be either a metal or a hard resin. From the viewpoint of workability, etc., metallic adherends are preferable. The metal as the adherend is not specifically limited, and may be a conventional adherend. For example, cold rolled steel sheet, zinc galvanized steel sheet, aluminum/zinc alloy galvanized steel sheet, stainless steel sheet, aluminum sheet, aluminum alloy sheet, magnesium sheet, magnesium alloy sheet, etc. may be used. In addition, it is possible to use an injection molding product of magnesium.

The method for applying the photocurable elastomer composition on the adherend is not specifically limited, and may be selected appropriately from conventional methods. The application may be performed, for example, by adjusting the photocurable elastomer composition to a desired temperature and viscosity if necessary, and by using gravure coating, roll coating, spin coating, reverse coating, bar coating, screen coating, blade coating, air knife coating, dipping, dispensing, etc. After applying the photocurable elastomer composition to the adherend and, if necessary, forming, it is possible to obtain a component equipped with the seal material, by curing the photocurable elastomer composition via light irradiation.

The light to cure the photocurable elastomer composition may be selected appropriately from ultraviolet ray, charged particle radiations such as α-ray, β-ray and the like, electromagnetic waves such as γ-ray and the like, and ionizing radiations containing high-energy particles. As for such a light, from the viewpoint of operatability, productivity and economy, ultraviolet ray is preferable. The ultraviolet ray source may be a conventional one, for example, xenon lamp, low pressure mercury lamp, high pressure mercury lamp, metal halide lamp, microwave-driven excimer lamp, etc. The atmosphere for irradiation of ultraviolet ray may be either an air atmosphere, an inert gas atmosphere of nitrogen gas, carbon dioxide, or an atmosphere with a reduced oxygen concentration. As for such an atmosphere, an inert gas atmosphere or an atmosphere with a reduced oxygen concentration is preferable.

The temperature of the irradiation atmosphere may be adjusted appropriately, and is ordinarily set to be 10 to 200° C. The irradiation time may be adjusted appropriately, and is ordinarily set to be 10 seconds to 60 minutes. The integral of light may be adjusted appropriately, and is ordinarily preferably set to be 1,000 to 20,000 mJ/cm$^2$.

(Gasket for Hard Disc Drive)

The gasket for hard disc drive relating to this disclosure uses the aforementioned photocurable elastomer composition in at least a part thereof. Thereby, the gasket for hard disc drive of this disclosure is excellent in softness and barrier property, suppresses bleeding out, and further has a low (excellent) compression set.

As for the gasket for HDD relating to this disclosure, from the viewpoint of both softness and barrier property of the gasket for HDD, the softness is preferably 85 or lower in terms of the JIS-A hardness as mentioned below, more preferably 25 to 70, further more preferably 30 to 60.

Barrier property of the gasket for HDD relating to this disclosure may be adjusted appropriately depending on the usage. As for barrier property of the gasket for HDD relating to this disclosure, the water-vapor permeability mentioned below is preferably 10 or lower.

As for the compression set of the gasket for HDD relating to this disclosure, the value of the compression set test mentioned below is preferably 80% or lower, more preferably 50% or less, further more preferably 30% or less. Thereby, a higher reworkability is obtained.

The compression set of the gasket for HDD using the photocurable elastomer composition relating to the third embodiment in at least a part thereof preferably has the compression set mentioned below of 50% or less, more preferably 30% or lower, further more preferably 20% or less.

(Apparatus)

The apparatus relating to this disclosure uses the aforementioned seal material in at least a part thereof. Thereby, it is possible to obtain excellent softness and barrier property, and to suppress bleeding out.

The apparatus relating to this disclosure may be, for example, HDD; various computers such as desktop type, note type, tablet type and the like; mobile phone; ink tank; pipings; various display devices such as liquid crystal display device, organic EL display, electronic paper, plasma display and the like; camera; speaker; vibration controlling device; waterproof equipment; damper; water purification equipment; air purification equipment; mixer; pump; automobile component, etc.

EXAMPLES

This disclosure will be explained in further detail below according to examples, although this disclosure is not limited to the disclosed examples.

Examples 1 to 18 and Comparative Examples 1 to 17

A photocurable elastomer composition was prepared by compounding each component according to the formulation shown in Tables 1 and 2 (the values of each component represent parts by mass). Additionally, hardness (softness), water-vapor permeability (barrier property), bleeding out and compression set were measured and evaluated according to the method below. The results are as shown in Tables 1 and 2.

Each component is shown as below in Tables 1 and 2.

Polyisobutylene A (the component (A)): Epion® 200A (number average molecular weight: 5,000), made by Kaneka Corporation Polyisobutylene B (the component (A)): Epion® 400A (number average molecular weight: 10,000), made by Kaneka Corporation Polyisobutylene C (the component (A)): Epion® 600A (number average molecular weight: 15,000), made by Kaneka Corporation Polyisobutylene D (the component (A)): Tetrax® 3T (number average molecular weight: 30,000), made by JX Nippon Oil & Energy Corp.

Polyisobutylene E (the component (A)): Tetrax® 4T (number average molecular weight: 40,000), made by JX Nippon Oil & Energy Corp.

Further, the percentage of —[$CH_2C(CH_3)_2$]— units in the polyisobutylenes A to E is 99% or more.

Monomer A (the component (B)): IBXA (isobornyl acrylate, a monofunctional acrylate monomer), made by Osaka Organic Chemical Industry, Ltd.

Monomer B (the component (B)): Light acrylate L-A (lauryl acrylate, a monofunctional acrylate monomer), made by Kyoeisha Chemical Co., Ltd.

Monomer C (the component (B)): FA-513AS (dicyclopentanyl acrylate, a monofunctional acrylate monomer), made by Hitachi Chemical Industries Co., Ltd.

Photo polymerization initiator (the component (C)): Irgacure® 184, made by BASF

Methacryl-modified polyisoprene (the component (D)): UC-102 (number average molecular weight: 17,000, having two reactive functional groups on the side chains), made by Kuraray Co., Ltd.

Acryloyl-modified polybutadiene (the component (D)): CN-307 (number average molecular weight: 3,500, having two reactive functional groups), made by Arkema Urethane acrylate (the component (D)): CN-9014, made by Arkema Acryloyl-modified hydrogenated polybutadiene (the component (D)): TEAI-1000 (number average molecular weight: 2,000, having acryloyl groups on both terminals), made by Nippon Soda Co., Ltd.

Urethane acrylate: Light tuck PUA-KH32M, made by Kyoeisha Chemical Co., Ltd.

Bisphenol A type epoxy acrylate: CN-104LC, made by Arkema

[Softness (Hardness)]

A sheet was obtained by forming a film having a thickness of about 2 mm with the photocurable elastomer composition, and performing light irradiation to the same by using a metal halide lamp. The light irradiation was performed under air atmosphere at conditions such that the illumination is about 150 mW/cm$^2$, and the integral of light is about 9000 mJ/cm$^2$. This sheet was further subjected to baking for 4 hours at 120° C. under air atmosphere. With respect to this sheet, the hardness was measured with a type A durometer, according to JIS K 6253. A lamination, having a thickness of about 6 mm, of 3 sheets having a thickness of about 2 mm was used as a specimen. Further, the hardness A is shown in such a way that 85 or lower is regarded as excellent.

[Barrier Property (Water-Vapor Permeability)]

A sheet having a thickness of about 1 mm was measured at a 50° C. relative humidity of 90% according to JIS Z 0208, by using a permeability cup of the method A disclosed in JIS L 1099. Further, water-vapor permeability is preferably to be as low as possible, and shown as excellent if being 10 (g/m$^2$·day) or less.

[Suppression of Bleeding Out]

A lamination of 5 cured products (sheets having a thickness of 2 mm) obtained via the aforementioned UV irradiation, which has a total thickness of 10 mm, was compressed to a set of 25% while the front and back thereof are sandwiched between separated PET, and after left standing for 22 hours, the transcription status of PIB to the separated PET was judged with sense of touch.

<<Evaluation Criteria>>

Excellent: no bleedings at all (not felt by hand at all)

Good: minimal bleedings (the separated PET having slight stickiness)

Fail: having bleedings (visible even by visual observation)

[Compression Set]

The compression set was measured at a test temperature of 70° C., by using a lamination of 5 sheets having a thickness of 2 mm, which are cut into a 2 cm rectangular shape, as a measurement sample, according to JIS K 6262. Further, the compression set is preferably as low as possible, and is regarded as excellent if being 80% or less.

TABLE 1

|   |   | Examples | | | | | | | | |
|---|---|---|---|---|---|---|---|---|---|---|
|   |   | 1 | 2 | 3 | 4 | 5 | 6 | 7 | 8 | 9 |
| (A) | Polyisobutylene A | 30 | | | | | | | | |
|   | Polyisobutylene B | | 30 | | | | | | | |
|   | Polyisobutylene C | | | 30 | | | | | | |
|   | Polyisobutylene D | | | | 30 | | 12 | | 39 | |
|   | Polyisobutylene E | | | | | 30 | | 20 | | 39 |
| (B) | Monomer A | 70 | 70 | 70 | 70 | 70 | 88 | 80 | 61 | 61 |
|   | Monomer B | | | | | | | | | |
|   | Monomer C | | | | | | | | | |
| (C) | Photo polymerization initiator | 1 | 1 | 1 | 1 | 1 | 1 | 1 | 1 | 1 |
| (D) | UC-102 | | | | | | | | | |
|   | CN-307 | | | | | | | | | |
|   | CN9014 | | | | | | | | | |
|   | TEAI-1000 | | | | | | | | | |
| Others | PUA-KH32M | | | | | | | | | |
|   | CN104LC | | | | | | | | | |
| Properties | Hardness | 75 | 75 | 75 | 77 | 79 | 85 | 82 | 70 | 73 |
|   | Water-vapor permeability [g/m$^2$ · day] | 4 | 4 | 4 | 4 | 4 | 7 | 7 | 3 | 3 |
|   | Bleeding out | Good | Good | Good | Excellent | Excellent | Excellent | Excellent | Good | Good |
|   | Compression set (%) | 82 | 81 | 81 | 83 | 85 | 93 | 90 | 78 | 77 |

|   |   | Examples | | | | | | | | |
|---|---|---|---|---|---|---|---|---|---|---|
|   |   | 10 | 11 | 12 | 13 | 14 | 15 | 16 | 17 | 18 |
| (A) | Polyisobutylene A | | | | | | | | | |
|   | Polyisobutylene B | | | | | | | | | |
|   | Polyisobutylene C | | | | | | | | | |
|   | Polyisobutylene D | 30 | 30 | 39 | 30 | 15 | 30 | 30 | 30 | 30 |
|   | Polyisobutylene E | | | | | | | | | |
| (B) | Monomer A | 50 | | | 55 | 40 | 55 | 55 | 55 | 55 |
|   | Monomer B | 20 | 20 | | | | | | | |
|   | Monomer C | | | 50 | 61 | | | | | |
| (C) | Photo polymerization initiator | 1 | 1 | 1 | 1 | 1 | 1 | 1 | 1 | 1 |
| (D) | UC-102 | | | | 15 | 45 | | | | |
|   | CN-307 | | | | | | 15 | | | |
|   | CN9014 | | | | | | | 15 | | |
|   | TEAI-1000 | | | | | | | | 15 | |
| Others | PUA-KH32M | | | | | | | | | 15 |
|   | CN104LC | | | | | | | | | |
| Properties | Hardness | 60 | 71 | 85 | 64 | 48 | 80 | 74 | 79 | 75 |
|   | Water-vapor permeability [g/m$^2$ · day] | 6 | 6 | 4 | 6 | 9 | 4 | 4 | 4 | 6 |
|   | Bleeding out | Good | Good | Good | Good | Excellent | Good | Good | Good | Good |
|   | Compression set (%) | 80 | 86 | 77 | 79 | 27 | 79 | 76 | 77 | 75 |

TABLE 2

|   |   | Comparative examples | | | | | | | | |
|---|---|---|---|---|---|---|---|---|---|---|
|   |   | 1 | 2 | 3 | 4 | 5 | 6 | 7 | 8 | 9 |
| (A) | Polyisobutylene A | | | | | 70 | 50 | 40 | 35 | 35 |
|   | Polyisobutylene B | | | | | | | | | |
|   | Polyisobutylene C | | | | | | | | | |
|   | Polyisobutylene D | 70 | | 40 | | | | | | |
|   | Polyisobutylene E | | 70 | | 40 | | | | | |
| (B) | Monomer A | 30 | 30 | 60 | 60 | 30 | 50 | 60 | 30 | 30 |
|   | Monomer B | | | | | | | | | |
|   | Monomer C | | | | | | | | | |
| (C) | Photo polymerization initiator | 1 | 1 | 1 | 1 | 1 | 1 | 1 | 1 | 1 |
| (D) | UC-102 | | | | | | | | 35 | |
|   | CN-307 | | | | | | | | | 35 |
|   | CN9014 | | | | | | | | | |
|   | TEAI-1000 | | | | | | | | | |
| Others | PUA-KH32M | | | | | | | | | |
|   | CN104LC | | | | | | | | | |
| Properties | Hardness | 55 | 60 | 66 | 69 | 26 | 60 | 70 | 18 | 70 |
|   | Water-vapor permeability [g/m$^2$ · day] | 2 | 2 | 3 | 3 | 2 | 3 | 4 | 5 | 5 |
|   | Bleeding out | Fail | Fail | Fail | Fail | Fail | Fail | Fail | Fail | Fail |
|   | Compression set (%) | 95 | 95 | 82 | 81 | 96 | 89 | 85 | 24 | 47 |

TABLE 2-continued

|  |  | Comparative examples | | | | | | | |
| --- | --- | --- | --- | --- | --- | --- | --- | --- | --- |
|  |  | 10 | 11 | 12 | 13 | 14 | 15 | 16 | 17 |
| (A) | Polyisobutylene A | 70 | 70 |  |  | 80 |  |  |  |
|  | Polyisobutylene B |  |  | 70 |  |  |  |  |  |
|  | Polyisobutylene C |  |  |  | 70 |  |  |  |  |
|  | Polyisobutylene D |  |  |  |  |  |  |  |  |
|  | Polyisobutylene E |  |  |  |  |  |  |  |  |
| (B) | Monomer A |  |  | 30 | 30 | 20 | 30 | 30 | 30 |
|  | Monomer B | 30 |  |  |  |  |  |  |  |
|  | Monomer C |  | 30 |  |  |  |  |  |  |
| (C) | Photo polymerization initiator | 1 | 1 | 1 | 1 | 1 | 1 | 1 | 1 |
| (D) | UC-102 |  |  |  |  |  |  |  | 70 |
|  | CN-307 |  |  |  |  |  |  |  |  |
|  | CN9014 |  |  |  |  |  |  |  |  |
|  | TEAI-1000 |  |  |  |  |  |  |  |  |
| Others | PUA-KH32M |  |  |  |  |  | 70 |  |  |
|  | CN104LC |  |  |  |  |  |  | 70 |  |
| Properties | Hardness | 15 | 55 | 35 | 40 | *1 | 35 | >90 | 10 |
|  | Water-vapor permeability [g/m² · day] | 4 | 2 | 2 | 2 | *1 | 24 | 2 | 14 |
|  | Bleeding out | Fail | Fail | Fail | Fail | *1 | Excellent | Excellent | Excellent |
|  | Compression set (%) | 95 | 96 | 95 | 94 | *1 | 11 | 65 | 13 |

*1: Unmeasured because not hardening

According to Examples 1 to 5, it is understood that in Examples 4 and 5, which have a high number average molecular weight of the component (A), bleeding out of the component (A) is further suppressed.

According to Examples 4, 6 and 8, it is understood that in the mass ratio ((A):(B)) between the component (A) and the component (B), the higher ratio of the component (A), the higher the barrier property (the lower the water-vapor permeability). In addition, according to Examples 4, 6 and 8, it is understood that in the mass ratio ((A):(B)) between the component (A) and the component (B), the higher the ratio of the component (B), the furtherer bleeding out of the component (A) is suppressed. In Examples 5, 7 and 9, it is understood that barrier property and bleeding out has a similar currency.

According to Examples 8 and 12 or 10 and 11, it is understood that as the component (B), comparing to Example 12, which uses dicyclopentanyl acrylate, Example 8, which uses isobornyl acrylate, has a higher softness.

According to Examples 13 to 18, it is understood that compression set is lowered by using the component (D). In particular, in Example 14, where the content of the component (D) is higher, it is understood that bleeding out of the component (A) is highly suppressed, the softness is excellent, and the compression set is lowered extremely.

However, according to Comparative Examples 1 to 14, it is understood that when the mass ratio between the component (A) and the component (B) exceeds a certain range, it is impossible to suppress bleeding out of the component (A), or the formability is deteriorated.

Additionally, in Comparative Example 17, which uses the component (D) instead of the component (A), or Comparative Example 15, which uses urethane acrylate, which is a conventional ultraviolet curable elastomer, it is understood that the barrier property is greatly deteriorated. In addition, in Comparative Example 16, which uses an ultraviolet curable material without softness, it is understood that the softness is deteriorated.

A photocurable elastomer composition was prepared by compounding each component according to the formulation shown in Tables 3 and 4 (the values of each component represent parts by mass). Additionally, viscosity (workability), hardness (softness), water-vapor permeability (barrier property) and compression set were measured and evaluated according to the method below. The results are as shown in Tables 3 and 4.

[Workability (Viscosity)]

With respect to the photocurable elastomer composition, the viscosity was measured at 25° C. by using a viscometer. In addition, as studied materials without thixotropy, it is possible to consider the same as a Newtonian fluid, and the rotation numbers were set randomly.

Further, the viscosity would better have a lower value, and is preferably 8 Pa·s or less.

[Softness (Hardness)]

A sheet was obtained by forming a film having a thickness of about 2 mm with the photocurable elastomer composition, and performing light irradiation to the same by using a metal halide lamp. The light irradiation was performed under air atmosphere at conditions such that the illumination is about 150 mW/cm², and the integral of light is about 9000 mJ/cm².

With respect to this sheet, the hardness (Shore D) was measured by using a hardness meter (made by Kobubnshi Keiki Co., Ltd.). A lamination, having a thickness of about 6 mm, of 3 sheets having a thickness of about 2 mm was used as a specimen.

Further, the hardness would better have a lower value, and is preferably 60 or less.

[Barrier Property (Water-Vapor Permeability)]

The sheet having a thickness of about 1 mm was measured at a 60° C. relative humidity of 90% according to JIS Z 0208, by using a permeability cup of the method A disclosed in JIS L 1099.

Further, the water-vapor permeability would better have a lower value, and is preferably 10 [g/m²·day] or less.

[Compression Set]

The value of compression set, using a lamination of 5 pieces of the sheet having a thickness of 2 mm cut into a 2 cm rectangular shape as measurement samples, according to JIS K 6262, was measured after 22 hours at a test temperature of 70° C., and 30 minutes after releasing the compression.

Further, the compression set would better have a lower value, and is preferably 80% or less.

TABLE 3

|  |  | Referential Examples | | | | | | | | |
|---|---|---|---|---|---|---|---|---|---|---|
|  |  | 1 | 2 | 3 | 4 | 5 | 6 | 7 | 8 | 9 |
| (D) | Polymer A *1 | 40 | 30 | 25 | 30 | 25 | 20 | 10 | 10 | 20 |
|  | Polymer B *2 |  |  |  |  |  |  |  |  |  |
|  | Polymer C *3 |  |  |  |  |  |  |  |  |  |
| (D') | Polymer D *4 |  |  |  |  |  |  |  |  |  |
| (D) | Polymer E *5 |  |  |  |  |  |  |  |  |  |
|  | Polymer F *6 |  |  |  |  |  |  |  |  |  |
| (A) | Polyisobutylene A *7 | 10 | 20 | 25 | 30 | 25 | 30 | 40 | 20 | 40 |
| (A') | Polyisobutylene B *8 |  |  |  |  |  |  |  |  |  |
| (A) | Polyisobutylene C *9 |  |  |  |  |  |  |  |  |  |
| (B) | Monomer A *10 | 50 | 50 | 50 |  |  | 50 | 50 | 70 | 40 |
|  | Monomer B *11 |  |  |  | 40 |  |  |  |  |  |
|  | Monomer C *12 |  |  |  |  | 50 |  |  |  |  |
| (C) | Photo polymerization initiator A *13 | 2 | 2 | 2 | 2 | 2 | 2 | 2 | 2 | 2 |
|  | Photo polymerization initiator B *14 |  |  |  |  |  |  |  |  |  |
|  | Photo polymerization initiator C *15 |  |  |  |  |  |  |  |  |  |
| Mass ratio ((D):(A)) between (D) and (A) | | 80:20 | 60:40 | 50:50 | 58:42 | 50:50 | 40:60 | 20:80 | 33:67 | 33:67 |
| Mass (%) of (B) with respect to the total mass of (D), (A) and (B) | | 50 | 50 | 50 | 40 | 50 | 50 | 50 | 70 | 40 |
| Properties | Viscosity (Pa · s) | 2 | 2 | 2 | 6 | 2 | 2 | 2 | 1 | 8 |
|  | Hardness | 48 | 43 | 41 | 12 | 50 | 39 | 35 | 58 | 25 |
|  | Water-vapor permeability [g/m² · day] | 10 | 8 | 7 | 10 | 9 | 7 | 6 | 10 | 6 |
|  | Compression set (%) | 14 | 28 | 40 | 65 | 40 | 56 | 80 | 78 | 68 |

|  |  | Referential Examples | | | | | | | Example |
|---|---|---|---|---|---|---|---|---|---|
|  |  | 10 | 11 | 12 | 13 | 14 | 15 | 16 | 19 |
| (D) | Polymer A *1 | 40 |  |  |  |  | 40 | 40 | 40 |
|  | Polymer B *2 |  | 25 |  |  |  |  |  |  |
|  | Polymer C *3 |  |  | 40 |  |  |  |  |  |
| (D') | Polymer D *4 |  |  |  |  |  |  |  |  |
| (D) | Polymer E *5 |  |  |  | 25 |  |  |  |  |
|  | Polymer F *6 |  |  |  |  | 20 |  |  |  |
| (A) | Polyisobutylene A *7 | 20 | 25 | 10 | 25 | 20 | 10 | 10 |  |
| (A') | Polyisobutylene B *8 |  |  |  |  |  |  |  |  |
| (A) | Polyisobutylene C *9 |  |  |  |  |  |  |  | 10 |
| (B) | Monomer A *10 | 40 | 50 | 50 | 50 | 60 | 50 | 50 | 50 |
|  | Monomer B *11 |  |  |  |  |  |  |  |  |
|  | Monomer C *12 |  |  |  |  |  |  |  |  |
| (C) | Photo polymerization initiator A *13 | 2 | 2 | 2 | 2 | 2 |  |  | 2 |
|  | Photo polymerization initiator B *14 |  |  |  |  |  | 2 |  |  |
|  | Photo polymerization initiator C *15 |  |  |  |  |  |  | 2 |  |
| Mass ratio ((D):(A)) between (D) and (A) | | 67:33 | 50:50 | 80:20 | 50:50 | 50:50 | 80:20 | 80:20 | 80:20 |
| Mass (%) of (B) with respect to the total mass of (D), (A) and (B) | | 40 | 50 | 50 | 50 | 60 | 50 | 50 | 50 |
| Properties | Viscosity (Pa · s) | 8 | 1 | 7 | 2 | 1 | 2 | 2 | 6 |
|  | Hardness | 35 | 10 | 54 | 10 | 40 | 48 | 48 | 50 |
|  | Water-vapor permeability [g/m² · day] | 8 | 10 | 9 | 10 | 10 | 10 | 10 | 10 |
|  | Compression set (%) | 26 | 46 | 17 | 44 | 57 | 14 | 14 | 15 |

TABLE 4

|  |  | Comparative examples | | | Example | Comparative examples | | | | | | | | |
|---|---|---|---|---|---|---|---|---|---|---|---|---|---|---|
|  |  | 18 | 19 | 20 | 20 | 21 | 22 | 23 | 24 | 25 | 26 | 27 | 28 | 29 |
| (D) | Polymer A *1 | 50 |  |  | 25 | 40 | 20 |  | 15 | 65 | 50 | 20 |  | 40 |
|  | Polymer B *2 |  |  |  |  |  |  |  |  |  |  |  |  |  |
|  | Polymer C *3 |  |  |  |  |  |  |  |  |  |  |  |  |  |
| (D') | Polymer D *4 |  |  |  |  |  |  | 40 |  |  |  |  |  |  |
| (D) | Polymer E *5 |  |  |  |  |  |  |  |  |  |  |  |  |  |
|  | Polymer F *6 |  |  |  |  |  |  |  |  |  |  |  |  |  |
| (D') | Polymer G *6-2 |  |  |  |  |  |  |  |  |  |  |  | 40 |  |
| (A) | Polyisobutylene A *7 |  | 50 |  |  |  |  | 10 | 5 | 15 | 20 | 50 | 10 | 10 |
| (A') | Polyisobutylene B *8 |  |  | 50 | 25 |  |  |  |  |  |  |  |  |  |
| (A) | Polyisobutylene C *9 |  |  |  |  |  |  |  |  |  |  |  |  |  |
| (B) | Monomer A *10 | 50 | 50 | 50 | 50 | 60 | 80 | 50 | 80 | 20 | 30 | 30 | 50 |  |
|  | Monomer B *11 |  |  |  |  |  |  |  |  |  |  |  |  |  |
|  | Monomer C *12 |  |  |  |  |  |  |  |  |  |  |  |  |  |
| (B') | Monomer G *12-2 |  |  |  |  |  |  |  |  |  |  |  |  | 50 |

TABLE 4-continued

|  |  | Comparative examples | | | Example | Comparative examples | | | | | | | | |
|---|---|---|---|---|---|---|---|---|---|---|---|---|---|---|
|  |  | 18 | 19 | 20 | 20 | 21 | 22 | 23 | 24 | 25 | 26 | 27 | 28 | 29 |
| (C) | Photo polymerization initiator A *13 Photo polymerization initiator B *14 Photo polymerization initiator C *15 | 2 | 2 | 2 | 2 | 2 | 2 | 2 | 2 | 2 | 2 | 2 | 2 | 2 |
| Mass ratio ((D):(A)) between (D) and (A) *16 | | 100:0 | 0:100 | 0:100 | 50:50 | 100:0 | 100:0 | 80:20 | 75:25 | 81:19 | 71:29 | 29:71 | 80:20 | 80:20 |
| Mass (%) of (B) with respect to the total mass of (D), (A) and (B) *17 | | 50 | 50 | 50 | 50 | 60 | 80 | 50 | 80 | 20 | 30 | 30 | 50 | 50 |
| Properties | Viscosity (Pa · s) | 2 | 2 | 15 | 9 | 1 | 0.5 | 1 | 0.5 | 20 | 10 | 8 | 3 | Not hardening |
| | Hardness | 55 | 18 | 30 | 45 | 46 | 65 | 25 | 60 | 21 | 19 | 20 | 19 | |
| | Water-vapor permeability [g/m$^2$ · day] | 11 | 6 | 6 | 7 | 13 | 3 | 10 | 16 | 7 | 30 | 5 | 10 | |
| | Compression set (%) | 8 | 89 | 90 | 48 | 10 | 78 | 85 | 95 | 9 | 8 | 88 | 99 | |

Further, *1 to *17 in Tables 3 and 4 are shown as follows.

*1 Hydrogenated acryl-modified butadiene rubber: CN-9014 (number average molecular weight: 6,500, having (meth)acryloyl groups on both terminals, the main skeleton being hydrogenated), made by Sartomer

*2 Methacryl-modified isoprene rubber: UC-102 (number average molecular weight: 17,000, having 2 (meth)acryloyl groups on the side chains), made by Kuraray Co., Ltd.

*3 Hydrogenated acryl-modified butadiene rubber: TEAI-1000 (number average molecular weight: 2,000, having a (meth)acryloyl group on both terminals, the main skeleton being hydrogenated), made by Nippon Soda Co., Ltd.

*4 Acryl-modified butadiene rubber: Trade name L1253 (weight average molecular weight: 7,000, having a (meth) acryloyl group on one terminal, the main skeleton being hydrogenated), made by Kuraray Co., Ltd.

*5 Methacryl-modified isoprene rubber: Trade name UC-203 (number average molecular weight: 27,000, having 3 (meth)acryloyl groups on the side chains, the main skeleton being non-hydrogenated), made by Kuraray Co., Ltd.

*6 Urethane based acrylate polymer: Trade name UV-2000B (weight average molecular weight: 13,000, having (meth)acryloyl groups on both terminals), made by Nippon Synthetic Chemical Industry Co., Ltd.

*6-2 isoprene rubber: LIR-700 (number average molecular weight: 28,000, without (meth)acryloyl groups), made by Kuraray Co., Ltd.

*7 Polyisobutylene: (PIB, EPION 200A, number average molecular weight: 3,000, made by Kanegafuchi Chemical Industry Co., Ltd.)

*8 Polyisobutylene: (PIB, Tetrax 3T, number average molecular weight: 30,000, made by JX Nippon Oil & Energy Corp.)

*9 Polyisobutylene: (PIB, trade name: 600A, number average molecular weight: 15,000, made by Kanegafuchi Chemical Industry Co., Ltd.)

*10 IBXA (isobornyl acrylate, molecular weight: 208, a monofunctional acrylate monomer), made by Osaka Organic Chemical Industry, Ltd.

*11 Light acrylate L-A (lauryl acrylate, molecular weight: 240, a monofunctional acrylate monomer), made by Kyoeisha Chemical Co., Ltd.

*12 Fancryl-513AS (dicyclopentanyl acrylate, molecular weight: 206, a monofunctional acrylate monomer), made by Hitachi Chemical Industries Co., Ltd.

*12-2 Lauryl alcohol "Kakonaru 2098" (a monomer without photocurable functional groups), made by Kao

*13 2,4,6-trimethylbenzoylphenyl phosphine oxide (Lucirin TPO, made by BASF)

*14 1-hydroxycyclohexyl phenyl ketone (Irgacure 184, made by BASF)

*15 2-(dimethylamino)-2[(4-methylphenyl)methyl]-1-[4-(4-morhpolinyl)phenyl]-1-butanone (Irgacure 379, made by BASF)

*16 (A) contains (A'), and (B) contains (B').

*17 (A) contains (A'), (B) contains (B'), and (C) contains (C').

A photocurable elastomer composition was prepared by compounding each component according to the formulation shown in Tables 5 and 6 (the values of each component represent parts by mass). Additionally, hardness (softness), water-vapor permeability (barrier property) and compression set were measured and evaluated according to the method below. The results are as shown in Tables 5 and 6.

Each component is shown as below in Tables 5 and 6.

Polyisobutylene A (the component (A)): Epion® 200A (number average molecular weight: 5,000), made by Kaneka Corporation Polyisobutylene B (the component (A)): Epion® 400A (number average molecular weight: 10,000), made by Kaneka Corporation Polyisobutylene C (the component (A)): Epion® 600A (number average molecular weight: 15,000), made by Kaneka Corporation Polyisobutylene D (the component (A)): Tetrax® 3T (number average molecular weight: 30,000), made by JX Nippon Oil & Energy Corp.

Polyisobutylene E (the component (A)): Tetrax® 4T (number average molecular weight: 40,000), made by JX Nippon Oil & Energy Corp.

Further, the percentage of —[CH$_2$C(CH$_3$)$_2$]— units in the polyisobutylenes A to E is 99% or more.

Methacryl-modified polyisoprene (the component (D)): UC-102 (number average molecular weight: 17,000, having two reactive functional groups on the side chains), made by Kuraray Co., Ltd.

Acryl-modified polybutadiene (the component (D)): CN-307 (number average molecular weight: 3,500, having 2 reactive functional groups), made by Arkema Monomer A (the component (B)): IBXA (isobornyl acrylate, a monofunctional acrylate monomer), made by Osaka Organic Chemical Industry, Ltd.

Monomer B (the component (B)): Light acrylate L-A (lauryl acrylate, a monofunctional acrylate monomer), made by Kyoeisha Chemical Co., Ltd.

Monomer C (the component (B)): FA-513AS (dicyclopentanyl acrylate, a monofunctional acrylate monomer), made by Hitachi Chemical Industries Co., Ltd.

Monomer D (the component (B)): Light acrylate 1.9ND-A (1,9-nonanediol diacrylate, a bifunctional acrylate monomer), made by Kyoeisha Chemical Co., Ltd.

Photo polymerization initiator (the component (C)): Irgacure® 184, made by BASF

Fumed silica (the component (E)): HDK® N20, made by Wacker Asahikasei Silicone Co., Ltd.

Urethane acrylate: Light tuck PUA-KH32M, made by Kyoeisha Chemical Co., Ltd.

Bisphenol A type epoxy acrylate: CN104LC, made by Arkema

[Softness (Hardness)]

A sheet was obtained by forming a film having a thickness of about 2 mm with the photocurable elastomer composition, and performing light irradiation to the same by using a metal halide lamp. The light irradiation was performed under air atmosphere at conditions such that the illumination is about 150 mW/cm$^2$, and the integral of light is about 9000 mJ/cm$^2$. This sheet was further subjected to baking for 4 hours at 120° C. under air atmosphere. With respect to this sheet, the hardness was measured with a type A durometer, according to JIS K 6253. A lamination, having a thickness of about 6 mm, of 3 sheets having a thickness of about 2 mm was used as a specimen. Further, the hardness A is shown in such a way that 80 or lower is regarded as excellent.

[Barrier Property (Water-Vapor Permeability)]

A sheet having a thickness of about 1 mm was measured at a 50° C. relative humidity of 90% according to JIS Z 0208, by using a permeability cup of the method A disclosed in JIS L 1099. Further, water-vapor permeability is preferably to be as low as possible, and shown as excellent if being 10 [g/m$^2$·day] or less.

[Compression Set]

The compression set was measured at a test temperature of 70° C., by using a lamination of 5 sheets having a thickness of 2 mm, which are cut into a 2 cm rectangular shape, as a measurement sample, according to JIS K 6262. Further, the compression set is preferably as low as possible, and is regarded as excellent if being 50% or less.

TABLE 5

| | | Referential Examples | | | | | | | | |
|---|---|---|---|---|---|---|---|---|---|---|
| | | 17 | 18 | 19 | 20 | 21 | 22 | 23 | 24 | 25 |
| (A) | Polyisobutylene A | 49 | 35 | 21 | | | | | 30 | 35 |
| | Polyisobutylene B | | | | 35 | | | | | |
| | Polyisobutylene C | | | | | 35 | | | | |
| | Polyisobutylene D | | | | | | 35 | | | |
| | Polyisobutylene E | | | | | | | 35 | | |
| (D) | Methacryl-modified polyisoprene | 21 | 35 | 49 | 35 | 35 | 35 | 35 | 30 | 35 |
| | Acryl-modified polybutadiene | | | | | | | | | |
| (B) | Monomer A | 30 | 30 | 30 | 30 | 30 | 30 | 30 | 40 | |
| | Monomer B | | | | | | | | | 30 |
| | Monomer C | | | | | | | | | |
| | Monomer D | | | | | | | | | |
| (C) | Photo polymerization initiator | 1 | 1 | 1 | 1 | 1 | 1 | 1 | 1 | 1 |
| (E) | Fumed silica | 5 | 5 | 5 | 5 | 5 | 5 | 5 | 6 | 5 |
| Others | PUA-KH32M | | | | | | | | | |
| | CN104LC | | | | | | | | | |
| Mass ratio (A):(D) | | 70:30 | 50:50 | 30:70 | 50:50 | 50:50 | 50:50 | 50:50 | 50:50 | 50:50 |
| (B) × 100/{(A) + (D) + (B)} | | 30 | 30 | 30 | 30 | 30 | 30 | 30 | 40 | 30 |
| Properties | Hardness | 43 | 43 | 38 | 51 | 56 | 56 | 62 | 58 | 31 |
| | Water-vapor permeability [g/m$^2$·day] | 3 | 6 | 8 | 5 | 5 | 3 | 3 | 6 | 7 |
| | Compression set (%) | 39 | 33 | 23 | 28 | 27 | 40 | 37 | 21 | 36 |

| | | Referential Examples | | | Examples | | | | | |
|---|---|---|---|---|---|---|---|---|---|---|
| | | 26 | 27 | 28 | 21 | 22 | 23 | 24 | 25 | 26 |
| (A) | Polyisobutylene A | 35 | 35 | 35 | 20 | 15 | 10 | 10 | 5 | 15 |
| | Polyisobutylene B | | | | | | | | | |
| | Polyisobutylene C | | | | | | | | | |
| | Polyisobutylene D | | | | | | | | | |
| | Polyisobutylene E | | | | | | | | | |
| (D) | Methacryl-modified polyisoprene | 35 | 35 | | 30 | 40 | 35 | 50 | 60 | 60 |
| | Acryl-modified polybutadiene | | | 35 | | | | | | |
| (B) | Monomer A | | | | 30 | 50 | 45 | 55 | 40 | 35 | 25 |
| | Monomer B | | | | | | | | | |
| | Monomer C | 30 | | | | | | | | |
| | Monomer D | | 30 | | | | | | | |
| (C) | Photo polymerization initiator | 1 | 1 | 1 | 1 | 1 | 1 | 1 | 1 | 1 |
| (E) | Fumed silica | 5 | 5 | 5 | 5 | 5 | 5 | 5 | 5 | 5 |
| Others | PUA-KH32M | | | | | | | | | |
| | CN104LC | | | | | | | | | |
| Mass ratio (A):(D) | | 50:50 | 50:50 | 50:50 | 40:60 | 27:73 | 22:78 | 17:83 | 8:92 | 20:80 |
| (B) × 100/{(A) + (D) + (B)} | | 30 | 30 | 30 | 50 | 45 | 55 | 40 | 35 | 25 |
| Properties | Hardness | 55 | 72 | 56 | 61 | 59 | 54 | 66 | 59 | 28 |
| | Water-vapor permeability [g/m$^2$·day] | 5 | 4 | 3 | 7 | 8 | 7 | 8 | 9 | 7 |
| | Compression set (%) | 22 | 41 | 14 | 49 | 48 | 36 | 29 | 23 | 37 |

TABLE 6

|  |  | Examples | | Comparative Examples | | | | | | | Referential Example |
|---|---|---|---|---|---|---|---|---|---|---|---|
|  |  | 27 | 28 | 30 | 31 | 32 | 33 | 34 | 35 | 36 | 29 |
| (A) | Polyisobutylene A | 5 | 4 | 56 |  |  | 70 |  |  | 40 | 20 |
|  | Polyisobutylene B |  |  |  |  |  |  |  |  |  |  |
|  | Polyisobutylene C |  |  |  |  |  |  |  |  |  |  |
|  | Polyisobutylene D |  |  |  |  |  |  |  |  |  |  |
|  | Polyisobutylene E |  |  |  |  |  |  |  |  |  |  |
| (D) | Methacryl-modified polyisoprene | 80 | 66 | 14 | 70 |  |  |  |  | 40 | 20 |
|  | Acryl-modified polybutadiene |  |  |  |  | 70 |  |  |  |  |  |
| (B) | Monomer A | 15 | 30 | 30 | 30 | 30 | 30 | 30 | 30 | 20 | 60 |
|  | Monomer B |  |  |  |  |  |  |  |  |  |  |
|  | Monomer C |  |  |  |  |  |  |  |  |  |  |
|  | Monomer D |  |  |  |  |  |  |  |  |  |  |
| (C) | Photo polymerization initiator | 1 | 1 | 1 | 1 | 1 | 1 | 1 | 1 | 1 | 1 |
| (E) | Fumed silica | 5 | 5 | 5 | 5 | 5 | 5 | 5 | 5 | 5 | 5 |
| Others | PUA-KH32M |  |  |  |  |  |  | 70 |  |  |  |
|  | CN104LC |  |  |  |  |  |  |  | 70 |  |  |
| Mass ratio (A):(D) |  | 6:94 | 6:94 | 80:20 | 0:100 | 0:100 | 100:0 | — | — | 50:50 | 50:50 |
| (B) × 100/{(A) + (D) + (B)} |  | 15 | 30 | 30 | 30 | 30 | 30 | 100 | 100 | 20 | 60 |
| Properties | Hardness | 21 | 28 | 43 | 30 | *1 | 45 | 50 | *1 | *3 | *1 |
|  | Water-vapor permeability [g/m² · day] | 11 | 11 | 3 | 14 | 16 | 2 | 24 | 2 | *3 | 7 |
|  | Compression set (%) | 15 | 14 | 53 | 18 | *2 | 89 | 10 | *2 | *3 | *2 |

*1 A hardness more than 80
*2 Unmeasured due to generation of breakage
*3 Unmeasured due to being uncompatible and separated

The invention claimed is:

1. A photocurable elastomer composition, comprising:
(A) a liquid polymer having a number average molecular weight of 5,000 or more, and containing 80 mass % or more of —[$CH_2C(CH_3)_2$]— units;
(B) a (meth)acrylate monomer;
(C) a photo polymerization initiator, wherein:
the mass ratio ((A):(B)) between the component (A) and the component (B) is 12:88 to 39:61.

2. The photocurable elastomer composition according to claim 1, the composition further comprising as a component (D) a polymer having a number average molecular weight of 1,000 or more and having two or more reactive functional groups per molecule, which are at least one selected from the group consisting of (meth)acryloyl group, vinyl group, vinylidene group and maleimide group, by 100 parts by mass or less with respect to 100 parts by mass in total of the component (A) and the component (B).

3. The photocurable elastomer composition according to claim 2, wherein: the component (D) is a polymer having a number average molecular weight of 2,000 or more and mainly containing any one selected from the group consisting of units derived from polyisoprene, units derived from polybutadiene, units derived from styrene-butadiene copolymer, units derived from ethylene-propylene copolymer, and units derived from hydrogenated products thereof.

4. The photocurable elastomer composition according to claim 1, wherein: the component (B) is a monofunctional acrylate.

5. The photocurable elastomer composition according to claim 1, wherein: the component (B) is at least one selected from the group consisting of hydrocarbon (meth)acrylates having 6 or more carbon atoms, isobornyl (meth)acrylate, and (meth)acrylates derived from dicyclopentadiene.

6. The photocurable elastomer composition according to claim 1, wherein: the molecular weight of the component (A) is 5,000 to 15,000;
the composition further comprising as a component (D) a polymer having a number average molecular weight of 1,000 or more and having two or more reactive functional groups per molecule, which are at least one selected from the group consisting of (meth)acryloyl group, vinyl group, vinylidene group and maleimide group;
the mass ratio ((D):(A)) between the component (D) and the component (A) is 20:80 to 80:20; and
the content of the component (B) is 40 mass % to 70 mass % with respect to the total amount of the component (D), the component (A) and the component (B).

7. The photocurable elastomer composition according to claim 6, wherein: the component (D) has a hydrogenated butadiene skeleton as the main skeleton.

8. The photocurable elastomer composition according to claim 6, wherein: the component (D) has (meth)acryloyl groups on both terminals.

9. The photocurable elastomer composition according to claim 6, wherein: the component (B) has a cyclic hydrocarbon skeleton.

10. The photocurable elastomer composition according to claim 9, wherein: the component (B) is isobornyl acrylate.

11. The photocurable elastomer composition according to claim 1, the composition further comprising as the component (D) a polymer having a number average molecular weight of 3,000 or more and having two or more reactive functional groups per molecule, which are at least one selected from the group consisting of (meth)acryloyl group, vinyl group, vinylidene group and maleimide group, wherein:
the mass ratio ((A):(D)) between the component (A) and the component (D) is 7:93 to 75:25, and
the content of the component (B) is 25 to 55 mass % with respect to the total amount of the component (A), the component (D) and the component (B).

12. The photocurable elastomer composition according to claim 11, wherein: the component (D) is a polymer mainly containing any one selected from the group consisting of units derived from polyisoprene, units derived from polybutadiene, units derived from styrene-butadiene copolymer, units derived from ethylene-propylene copolymer, and units derived from hydrogenated products thereof.

13. The photocurable elastomer composition according to claim 11, wherein: the component (B) is at least one monofunctional (meth)acrylate selected from the group consisting of hydrocarbon (meth)acrylates having 6 or more carbon atoms, isobornyl (meth)acrylate, and (meth)acrylates derived from dicyclopentadiene.

14. The photocurable elastomer composition according to claim 11, the composition further containing as the component (E) at least one selected from the group consisting of inorganic fillers and organic fillers.

15. The photocurable elastomer composition according to claim 14, wherein: the component (E) is a fumed silica.

16. The photocurable elastomer composition according to claim 1, the composition being for use in a seal material.

17. The photocurable elastomer composition according to claim 1, the composition being for use in a gasket for hard disc drive.

18. A seal material using the photocurable elastomer composition according to claim 1 in at least a part thereof.

19. A gasket for hard disc drive, the gasket using the photocurable elastomer composition according to claim 1 in at least a part thereof.

20. An apparatus, the apparatus using the seal material according to claim 18 in at least a part thereof.

21. A hard disc drive, the hard disc drive using the gasket for hard disc drive according to claim 19 in at least a part thereof.

* * * * *